US010327145B2

(12) United States Patent
Fan et al.

(10) Patent No.: US 10,327,145 B2
(45) Date of Patent: *Jun. 18, 2019

(54) POSITION AND AUTHENTICATE WI-FI USERS TO ENHANCE WI-FI SECURITY CONTROL AND MANAGEMENT

(71) Applicant: International Business Machines Corporation, Armonk, NY (US)

(72) Inventors: Si Bin Fan, Beijing (CN); Yu Gu, Cedar Park, TX (US); Su Liu, Austin, TX (US); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 313 days.

This patent is subject to a terminal disclaimer.

(21) Appl. No.: 15/421,871

(22) Filed: Feb. 1, 2017

(65) Prior Publication Data

US 2018/0131701 A1 May 10, 2018

Related U.S. Application Data

(63) Continuation of application No. 15/346,328, filed on Nov. 8, 2016, now Pat. No. 10,098,000.

(51) Int. Cl.
*G06F 15/173* (2006.01)
*H04W 12/08* (2009.01)
(Continued)

(52) U.S. Cl.
CPC ........ *H04W 12/08* (2013.01); *G06K 7/10128* (2013.01); *G06K 7/10366* (2013.01);
(Continued)

(58) Field of Classification Search
CPC .. H04W 12/08; H04W 4/021; G06K 7/10128; G06K 7/10366; H04L 63/0492; H04L 63/101; H04L 63/107
(Continued)

(56) References Cited

U.S. PATENT DOCUMENTS 6,184,651 B1 2/2001 Fernandez et al.
8,261,327 B2 9/2012 Keeler et al.
(Continued)

FOREIGN PATENT DOCUMENTS

WO 2015131949 9/2015

OTHER PUBLICATIONS

Chen et al., "Privacy-Preserving Location Authentication in WiFi with Fine-Grained Physical Layer Information," 2014 IEEE Global Communications Conference, Dec. 2014, Austin, TX, pp. 4827-4832.
(Continued)

*Primary Examiner* — Wing F Chang
*Assistant Examiner* — Joseph R Maniwang
(74) *Attorney, Agent, or Firm* — VanLeeuwen & VanLeeuwen; Damion C. Josephs

(57) ABSTRACT

An approach is provided that receives, from a radio frequency identification (RFID) tag included with a device, at least three different charge times. Each of the charge times corresponds to a different RFID reader that separately charges the RFID tag with each of the RFID readers being at a different geographic location. A distance between each of the RFID readers and the RFID tag is approximated based on the respective charge times and these approximate distances are used to identify a geographic position of the RFID tag using trilateration. The geographic position of the RFID tag is then used to determine whether to allow the device wireless access to a computer network.

7 Claims, 7 Drawing Sheets

(51) Int. Cl.
*G06K 7/10* (2006.01)
*H04W 4/021* (2018.01)
*H04L 29/06* (2006.01)

(52) U.S. Cl.
CPC ........ *H04L 63/0492* (2013.01); *H04L 63/101* (2013.01); *H04W 4/021* (2013.01); *H04L 63/107* (2013.01)

(58) Field of Classification Search
USPC ........................................................ 709/225
See application file for complete search history.

(56) References Cited

U.S. PATENT DOCUMENTS

| | | | |
|---|---|---|---|
| 8,862,882 | B2 | 10/2014 | Shaliv et al. |
| 8,954,035 | B2 | 2/2015 | Ergen |
| 2006/0107307 | A1 | 5/2006 | Knox et al. |
| 2014/0179273 | A1 | 6/2014 | Kim et al. |
| 2014/0285317 | A1 | 9/2014 | Shimizu et al. |
| 2015/0048789 | A1 | 2/2015 | Kim et al. |
| 2016/0087486 | A1 | 3/2016 | Pogorelik et al. |
| 2016/0188920 | A1 | 6/2016 | Kelly et al. |

OTHER PUBLICATIONS

Shu et al., "TOC: Localizing Wireless Rechargeable Sensors with Time of Charge," IEEE INFOCOM 2014—IEEE Conference on Computer Communications, Apr. 2014, Toronto, ON, pp. 388-396.

Zhao et al., "A Battery-free Object Localization and Motion Sensing Platform," 2013 IEEE International Conference on RFID (RFID), Apr. 2013, Penang, pp. 110-117.

Geoff, "Give Free Wifi in Exchange for a Facebook Check-In," wersm, we are social media, Jun. 2014, 4 pages.

Sporl, "You'll Like This! Cisco Meraki Wifi With Facebook Login," Cisco Systems, Inc., May 2013, 3 pages.

Raheja, WeChat—This is how Social Wi-Fi is done in China, Mojo Connect, AirTightTeam, Sep. 2014, 9 pages.

Fan et al., "Position and Authenticate Wi-Fi Users to Enhance Wi-Fi Security Control and Management," U.S. Appl. No. 15/346,328, filed Nov. 8, 2016, 36 pages.

"List of IBM Patents or Patent Applications Treated as Related," Letter from Leslie A. Van Leeuwen, Feb. 1, 2017, 1 page.

US 10,327,145 B2

POSITION AND AUTHENTICATE WI-FI USERS TO ENHANCE WI-FI SECURITY CONTROL AND MANAGEMENT

BACKGROUND OF THE INVENTION

Technical Field

This disclosure relates to identifying device positions based on RFID charge time amounts and allowing WiFi access accordingly.

Description of Related Art

Radio-frequency identification (RFID) uses electromagnetic fields to automatically identify and track tags attached to objects. The tags contain electronically stored information. RFID tags collect energy from a nearby RFID reader's interrogating radio waves. Because of their relatively low cost, RFID tags are being included in an increasing number of information handling system devices. These tags can further be embedded in such devices, rather than attached to the outside of the device. As the name implies, passive tags wait for a signal from an RFID reader. The reader sends energy to an antenna which converts that energy into an RF wave that is sent into the read zone. Once the tag is read within the read zone, the RFID tag's internal antenna draws in energy from the RF waves. Because passive RFID tags do not require a power source, such as a battery, the tags are quite reliable and have a longevity greater than most of the information handling system devices in which they might be embedded. Due to the low cost, reliability, and longevity of passive RFID tags, a trend is that many, if not most, information handling system devices will include such one or more passive RFID tags.

Mobile information handling system devices often connect to a network, such as the Internet, using WiFi technology. WiFi allows devices to connect to the network over a wireless local area network (LAN) connection. Many businesses, such as restaurants, hotels, and other businesses, provide free WiFi with the aim of providing WiFi connectivity to the businesses' customers to provide such customers with a satisfying experience when associating with such businesses. While WiFi connections can be password protected so that users have to enter a password provided by the business to access the network, such password protected installations require the customer to retrieve the password from the business and enter the password at the customer's device. In addition, most businesses refrain from frequently changing the password due to costs and efforts involved in changing the passwords, communicating new passwords to employees and customers, and entering new passwords into the businesses' WiFi devices.

Many users of a business' WiFi are often not customers of the business and, instead, are referred to as "squatters." When near enough to the business' WiFi access points and routers, a non-customer can gain access to the WiFi either by obtaining the WiFi password, that generally is not well protected, or because the WiFi does not require a password. The number of users of a WiFi affects the speed of the WiFi connection, therefore legitimate customers of a business might experience slow speeds due to a large number of non-customer "squatters" that are using the business' WiFi.

SUMMARY

An approach is provided that receives, from a radio frequency identification (RFID) tag included with a device, three different charge times. Each of the charge times corresponds to a different RFID reader that separately charges the RFID tag with each of the RFID readers being at a different geographic location. A distance between each of the RFID readers and the RFID tag is approximated based on the respective charge times and trilateration is performed using these approximate distances to identify a geographic position of the RFID tag. The geographic position of the RFID tag is then used to determine whether to allow the device wireless access to a computer network. Embodiments also provide a system and computer program product that perform the aforementioned approach.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
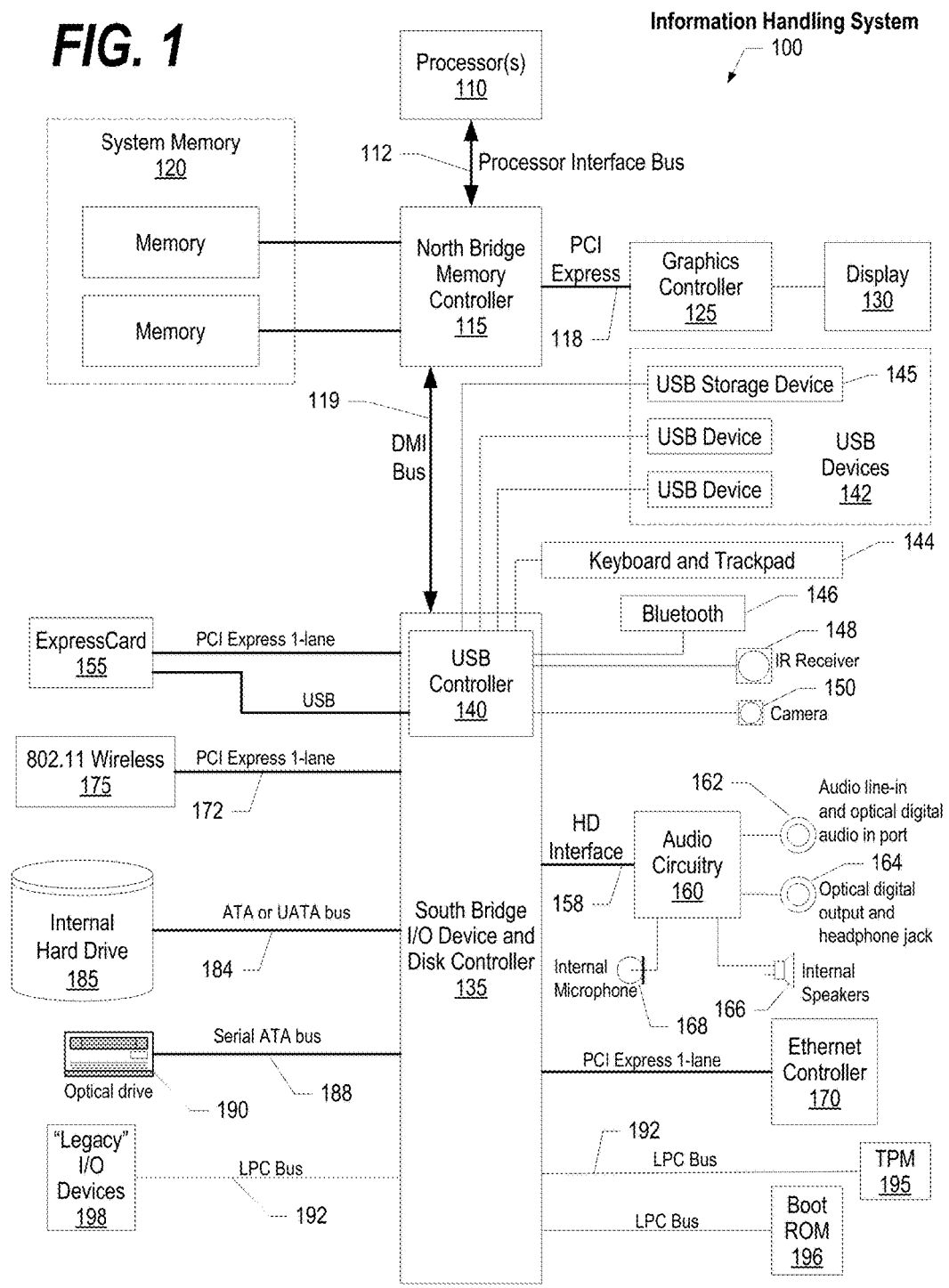
FIG. 1 depicts a block diagram of a processor and components of an information handling system.

FIGS. 1-7 show an approach that identifies a position of a device based on an RFID tag included in the device. The RFID tag is separately charged by a set of three or more RFID readers with the RFID tag reporting the amount of time taken to charge the RFID tag. The amount of time needed to charge the RFID tag is used to approximate the distance between the RFID tag and the respective RFID reader, with more time needed to charge the RFID tag when the RFID tag is further from the RFID reader. When approximate distances are computed between the RFID tag and each of three or more RFID readers, trilateration is used to identify the geographic position of the RFID tag, and hence the device that has the RFID tag embedded or otherwise included. The geographic position of the RFID tag, and device, is used to determine whether the device is within an area of interest, such as a business or organization (e.g., restaurant, hotel, coffee shop, office, etc.) that provides WiFi access to its patrons or customers. If the device is within the area of interest, then access to the organization's WiFi is provided. Likewise, when the device is outside the area of interest, then access to the organization's WiFi is denied. Device locations can be repeatedly updated over time to ascertain if a device enters or leaves the area of interest, with the device being granted or denied WiFi access accordingly.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
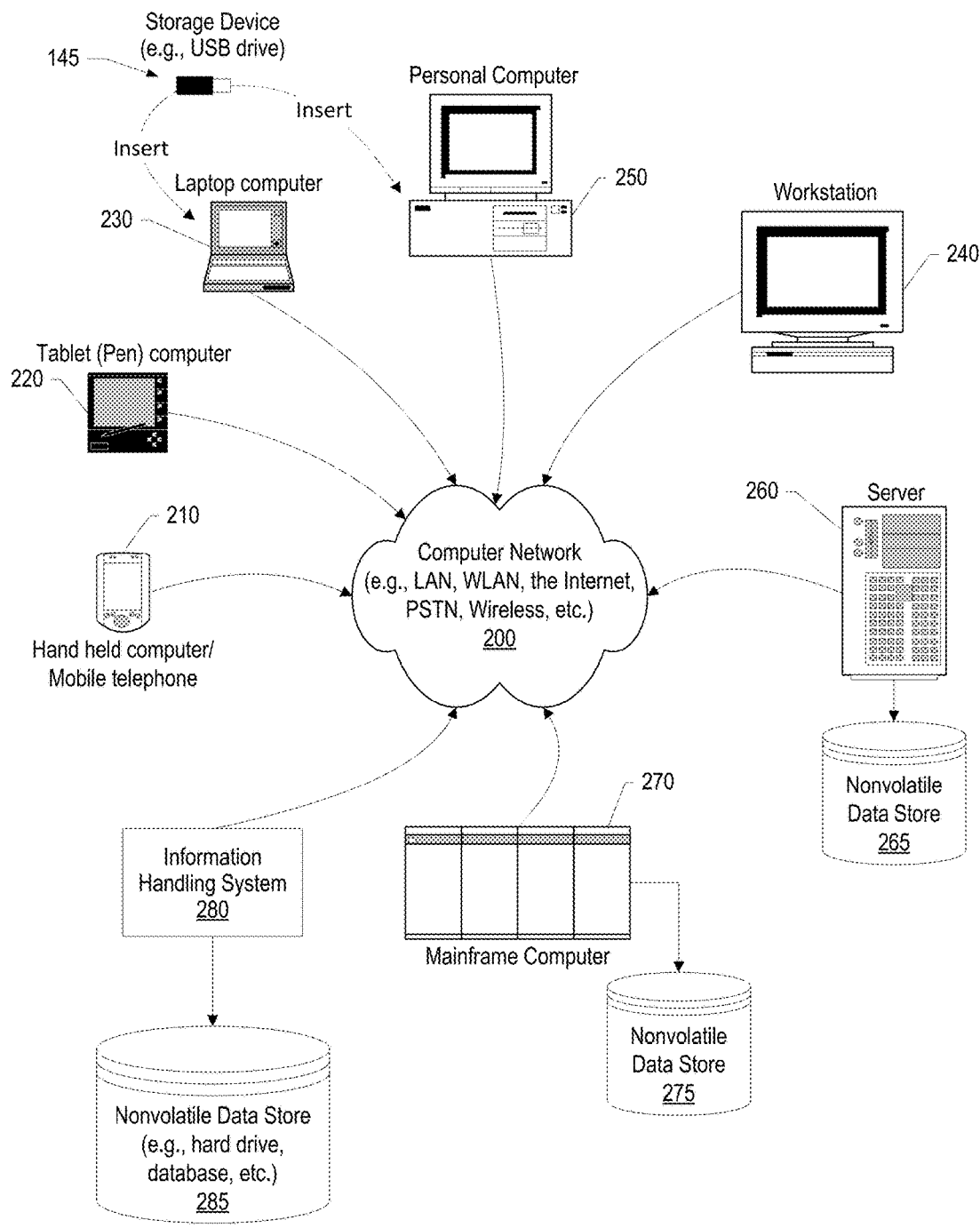
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
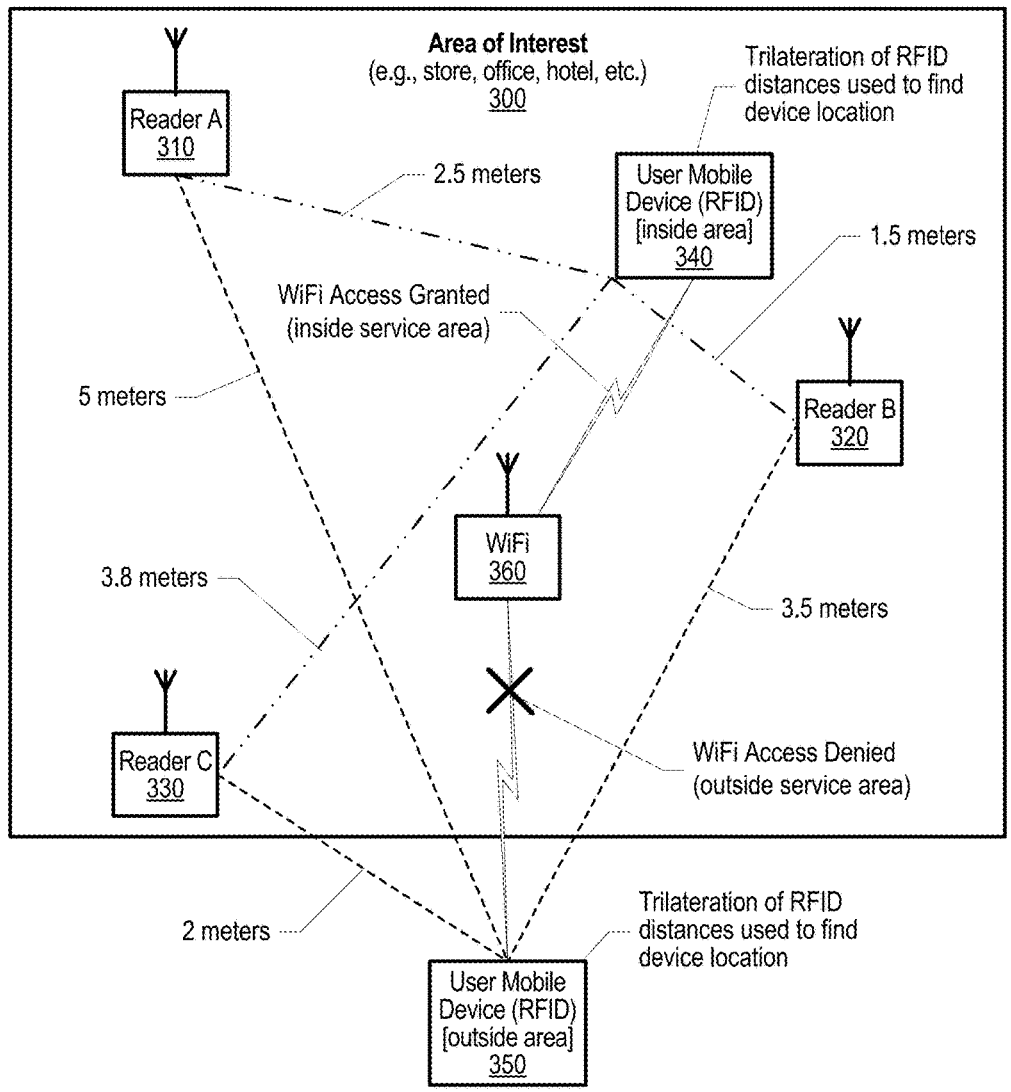
FIG. 3 is a diagram depicting a system using RFID charge times to identify device locations to determine whether devices are within an area of interest where WiFi access is provided.

FIG. 3 is a diagram depicting a system using RFID charge times to identify device locations to determine whether devices are within an area of interest where WiFi access is provided. Area of interest 300 can be any geographic area, such as a restaurant, hotel, coffee shop, office, etc. The operators of the area of interest wish to provide wireless, or WiFi, access to devices within the area of interest and deny access to devices that are outside the area of interest. Mobile devices 340 and 350, such as tablet computer systems, laptop computer systems, smart phones, or the like, have a radio frequency identification (RFID) tag embedded or otherwise included in such devices. Being passive tags, these RFID tags are charged by collecting energy from radio waves transmitted from RFID readers 310, 320, and 330. The RFID tag records the amount of time needed to charge the RFID tag and transmits the RFID tag's identifier and the amount of charge time back to the RFID reader. The amount of charge time is then used to approximate a distance between the RFID reader and the RFID tag.

Three or more RFID readers are used with each reader receiving the approximate distance from the respective RFID reader to the RFID tag. The geographic location of the three RFID readers is known so that when each of the readers receives the distance to the RFID tag, trilateration can be used to identify the position of the RFID tag, and thus the position of the device. In the example shown, device 340 is approximately 2.5 meters from RFID reader A (310), 1.5 meters from RFID reader B (320), and 3.8 meters from RFID reader C (330). Trilateration using these distances and the known geographic locations of the respective RFID readers results in the identified location of device 340 being at the geographic location show which is within the geographic area of interest. Consequently, device 340 is granted wireless access to the computer network, such as computer network 200 shown in FIG. 2, via WiFi controller 360 (e.g., a wireless access point, a wireless router, etc.). Likewise, device 350 is shown being approximately 5 meters from RFID reader A (310), 3.5 meters from RFID reader B (320), and 2 meters from RFID reader C (330). Trilateration of these distances using the known geographic locations of the respective RFID readers results in the identified location of device 350 being at the geographic location show which is outside the geographic area of interest. Consequently, device 350 is denied access to the computer network via WiFi controller 360.

Figure 4:
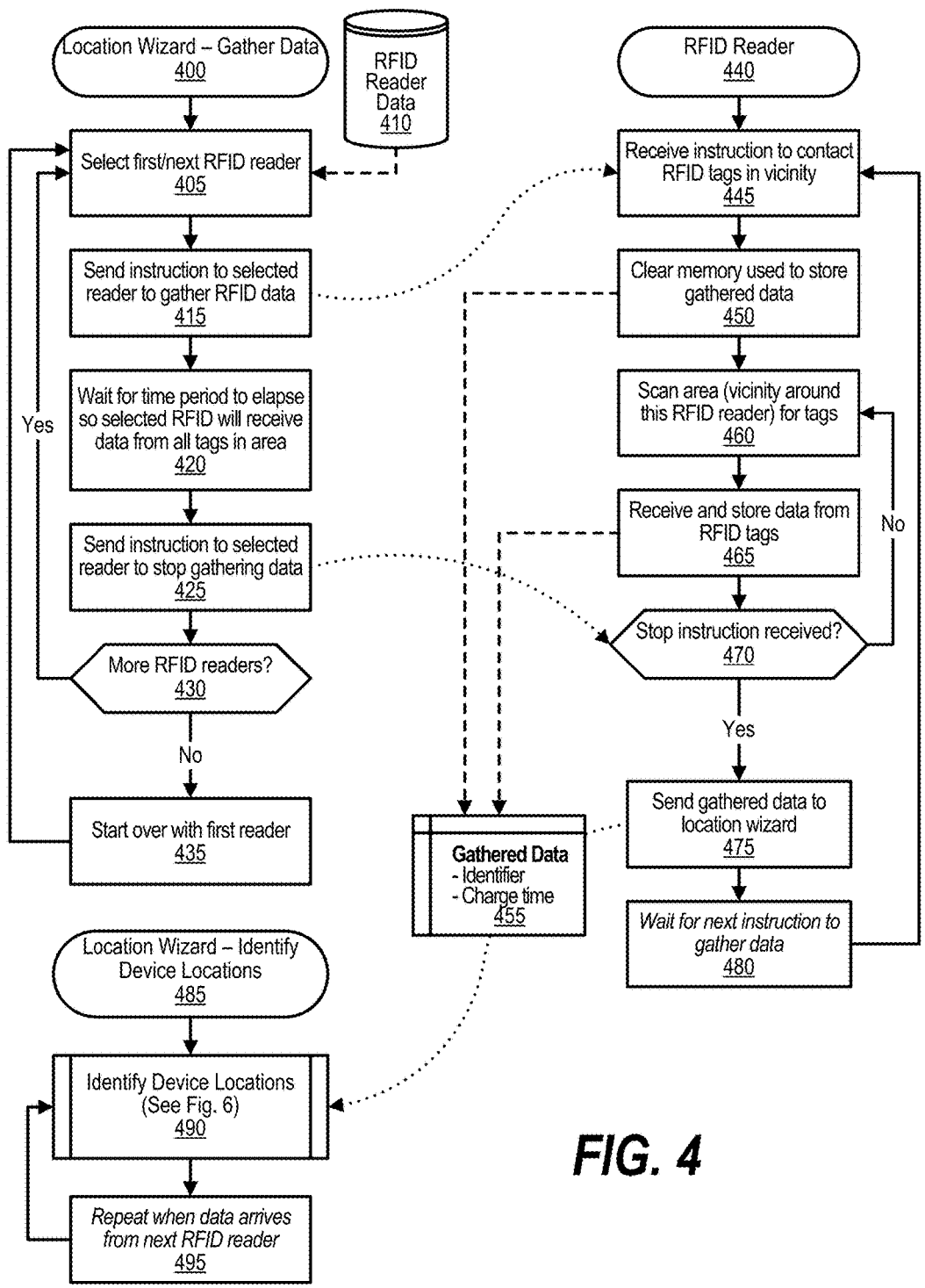
FIG. 4 is a flowchart showing high-level steps taken by a process that identifies locations of devices based on RFID charge times.

FIG. 4 is a flowchart showing high-level steps taken by a process that identifies locations of devices based on RFID charge times. FIG. 4 processing commences at 400 and shows the steps taken by a location wizard process that gathers data needed to identify locations of RFID tags included in wireless devices requesting WiFi access. At step 405, the process selects data pertaining to the first RFID reader that is being controlled by the process. The data regarding the RFID readers is retrieved from data store 410. At step 415, the process sends an instruction to the selected RFID reader that instructs the RFID reader to gather RFID data from any RFID tags within range of the reader. At step 420, the process waits for a time period to elapse. The time period is set to a period that is long enough to allow the selected RFID reader to transmit radio waves to any RFID tags within range of the reader, fully charge the RFID tags, and receive responsive data from the RFID tags. The responsive data will include the identifiers of the RFID tags as well as the amount of time needed, or taken, to fully charge the RFID tag by the selected RFID reader.

Once the time period set in step 420 elapses then, at step 425, the process sends an instruction to the selected RFID reader to stop gathering data. This quiets the RFID reader so that the reader no longer transmits radio waves. Quieting the RFID readers that are not currently gathering data allows each RFID reader, when selected, to communicate with the RFID tags without interference from other RFID readers so that a distance can be approximated between each of the RFID readers and the RFID tags that are within range. The process determines as to whether there are more RFID readers to select for receiving data from RFID tags (decision 430). In order to perform trilateration to identify the position of the RFID tags, at least three RFID readers are typically used. If there are more RFID readers to select, then decision 430 branches to the 'yes' branch which loops back to step 405 to select and process the next RFID reader as described above. This looping continues until all of the RFID readers that are being used have been selected, at which point decision 430 branches to the 'no' branch whereupon, at step 435, the process resets the RFID reader to the first reader and starts the process over again by looping back to step 405. Accordingly, this process operates continually.

RFID reader processing commences at 440 and shows the steps taken by the RFID reader that has been selected by the location wizard. Each of the RFID readers, when selected, perform steps 445 through 480. At step 445, the process receives the instruction from the location wizard to contact any RFID tags in range of this RFID reader. At step 450, the RFID reader process clears memory 455 that is used to store data gathered from the RFID tags that are in range of the reader. At step 460, the RFID reader process transmits radio waves in order to scans the area for all RFID tags that are within range of this RFID reader. The radio waves provide energy and charge the RFID tags with the RFID tags, when fully charge, transmitting the identifier of the respective RFID tag along with the amount of time taken to charge the respective RFID tag. As will be more fully explained infra, the amount of time taken to charge the RFID tag is used to approximate the distance between the RFID reader and the RFID tag. At step 465, the RFID reader process receives and stores data from RFID tags. This data includes the RFID tag's identifier and the amount of time taken to charge the RFID tag. In one embodiment, the data also includes the identifier of the device that is associated with the RFID tag, such as a media access control (MAC) address of the device. The data received at the RFID reader is stored in memory area 455.

The RFID reader process determines as to whether a stop instruction has been received from the location wizard process (decision 470). If a stop instruction has not been received, then decision 470 branches to the 'no' branch which loops back to step 460 to continue scanning the area around the RFID reader for data regarding nearby RFID tags. This looping continues until a stop instruction is received from the location wizard, at which point decision 470 branches to the 'yes' branch exiting the loop. At step 475, the RFID reader process sends the data gathered by the RFID reader that has been stored in memory area 455 back to the location wizard. At step 480, the RFID reader process enters a wait state and waits until it receives another instruction from the location wizard to once again scan the area for RFID tags that are within range, at which point processing loops back to step 445 to restart the process.

Location wizard processing that identifies device locations commences at 485 and shows the steps taken by a location wizard process that identifies device locations based on data returned by the RFID tags included with such devices. Predefined process 490, is the Identify Device Locations routine (see FIG. 6 and corresponding text for processing details). This routine receives data gathered by an RFID reader and checks to see if enough data has been gathered to perform trilateration to identify the location of the device. At step 495, the process repeats predefined process 490 whenever data arrives from another RFID reader. This process used to identify device locations operates continually.

Figure 5:
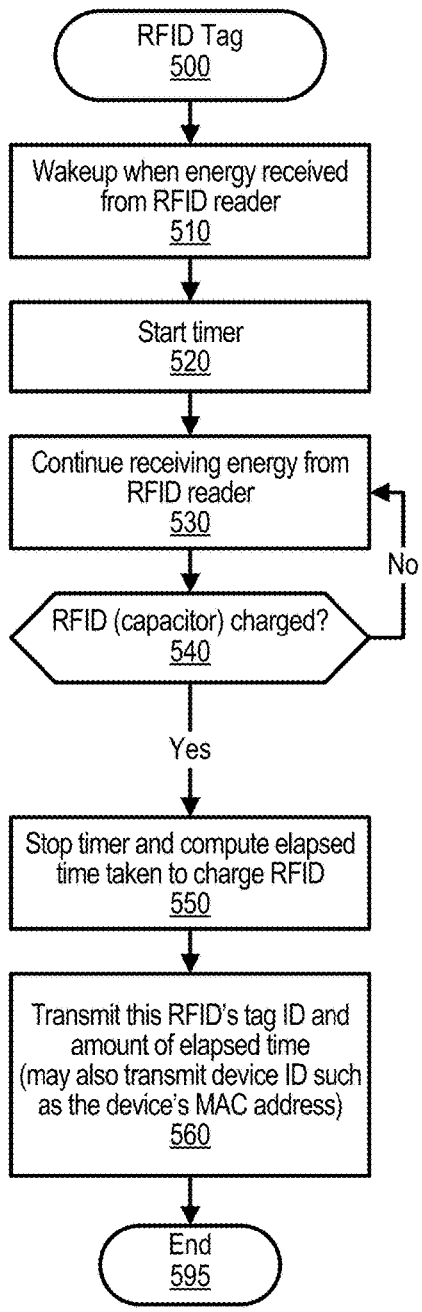
FIG. 5 is a flowchart showing steps taken at a device RFID tag that informs an RFID reader of the time taken to charge the RFID tag.

FIG. 5 is a flowchart showing steps taken at a device RFID tag that informs an RFID reader of the time taken to charge the RFID tag. FIG. 5 processing commences at 500 and shows the steps taken the RFID tag that is included in a device. At step 510, the RFID tag wakes up when energy received from RFID reader in the form of radio waves transmitted from the RFID reader. At step 520, the RFID tag starts a timer. At step 530, the RFID tag continues receiving energy from RFID reader. Decision 540 depicts a loop that operates until the RFID tag is fully charged. The amount of time needed to fully charge the RFID tag is based on the distance between the RFID tag and the RFID reader that is transmitting the radio waves. Once the RFID tag is fully charged then, at step 550, the RFID tag stops the timer and computes elapsed time that was taken to fully charge the RFID tag. At step 560, the RFID tag transmits this RFID tag's identifier and the amount of time that was taken to charge the RFID tag. In one embodiment, the RFID tag also transmits the device's identifier, such as the device's MAC address. The transmitted data is received by the RFID reader that transmitted the radio wave (the currently selected RFID reader as shown in FIG. 4). At step 595, the RFID tag process ends and, once radio waves are no longer being transmitted from the RFID reader, the charge of the RFID tag quickly dissipates.

Figure 6:
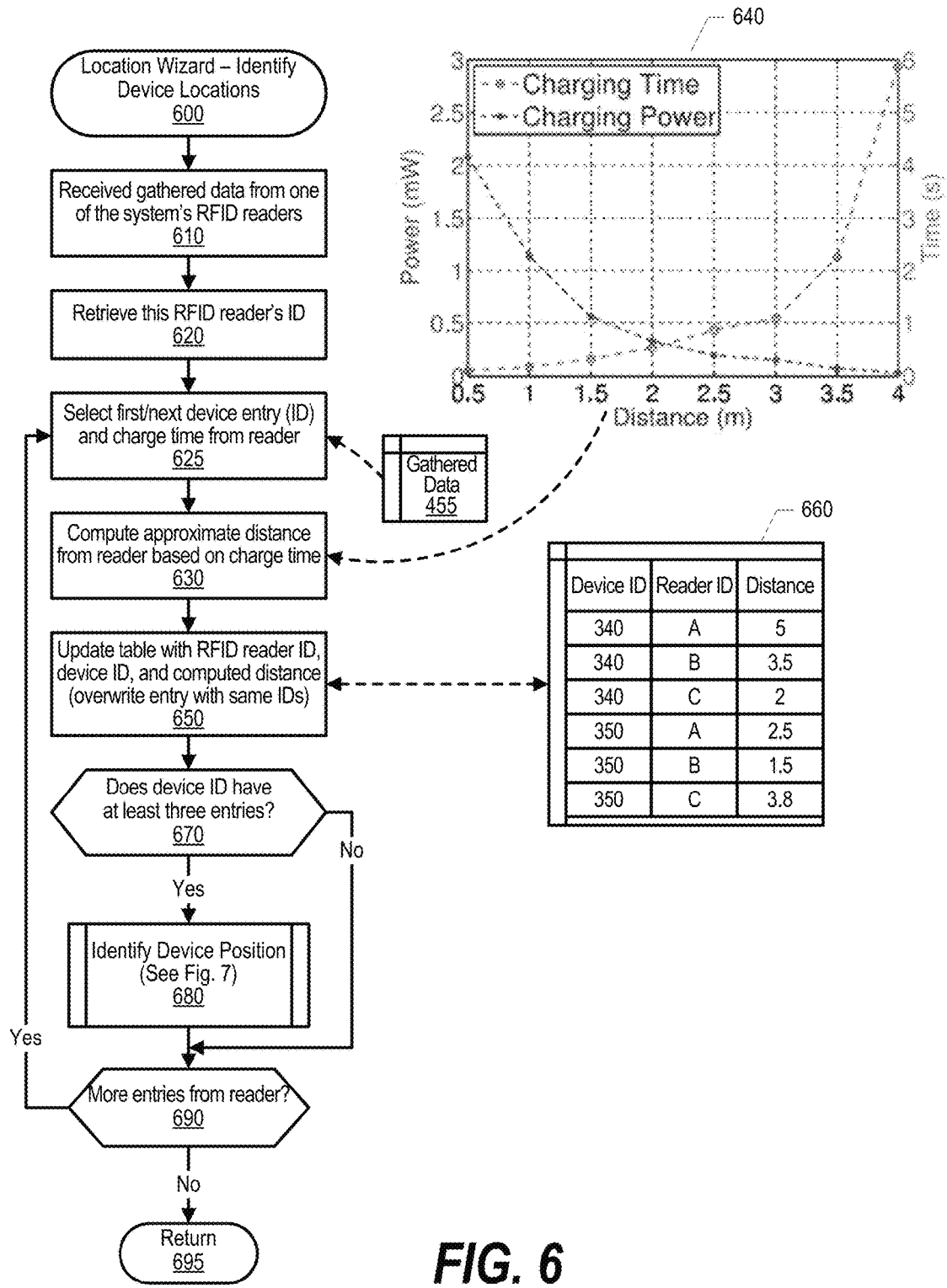
FIG. 6 is a flowchart showing steps taken to determine a distance between a device equipped with an RFID tag and a RFID tag reader based on the time taken to charge the RFID tag.

FIG. 6 is a flowchart showing steps taken to determine a distance between a device equipped with an RFID tag and a RFID tag reader based on the time taken to charge the RFID tag. FIG. 6 processing commences at 600 and shows the steps taken by the location wizard process that identifies device locations based on the locations of the RFID tags included in such devices. At step 610, the location wizard process receives gathered data from one of the system's RFID readers. At step 620, the location wizard process retrieves the identifier of the RFID reader from which the data was received (e.g., readers A, B, or C as shown in FIG. 3, etc.). At step 625, the location wizard process selects the first device entry (ID) and amount of charge time that was received from the RFID reader (e.g., memory area 455 shown in FIG. 4, etc.).

At step 630, the location wizard process computes an approximate distance between the RFID tag and the RFID reader based on the amount of charge time included in the RFID tag data. In one embodiment, graph 640 is used to make the approximation with distance and charge times being discovered through experimentation. In the graph, a charge time of one second corresponds to an approximate distance of three meters from the RFID reader, while a charge time of six seconds corresponds to a distance of four meters between the reader and the RFID tag. At step 650, the location wizard process updates table 660 with the RFID reader identifier, the device identifier, and the approximate distance between the reader and the RFID tag as found by step 630. If data from the same device identifier and reader identifier is already in table 660, then the data is updated with the distance computed by step 630.

The location wizard process determines whether this device identifier has at least three entries in table 660 indicating distance data from at least three different RFID readers (decision 670). If the device identifier has at least three entries, then decision 670 branches to the 'yes' branch to perform predefined process 680. On the other hand, if the device identifier does not yet have at least three entries in table 660, then decision 670 branches to the 'no' branch bypassing predefined process 680. At predefined process 680, the location wizard process performs the Identify Device Position routine (see FIG. 7 and corresponding text for processing details). The location wizard process determines whether there are more entries that have been received from the RFID reader that need to be processed (decision 690). If there are more entries that have been received from the RFID reader that need to be processed, then decision 690 branches to the 'yes' branch which loops back to step 625 to select and process the next set of data received from the RFID reader. This looping continues until there are no more entries that need to be processed, at which point decision 690 branches to the 'no' branch exiting the loop. FIG. 6 processing thereafter returns to the calling routine (see FIG. 4) at 695.

Figure 7:
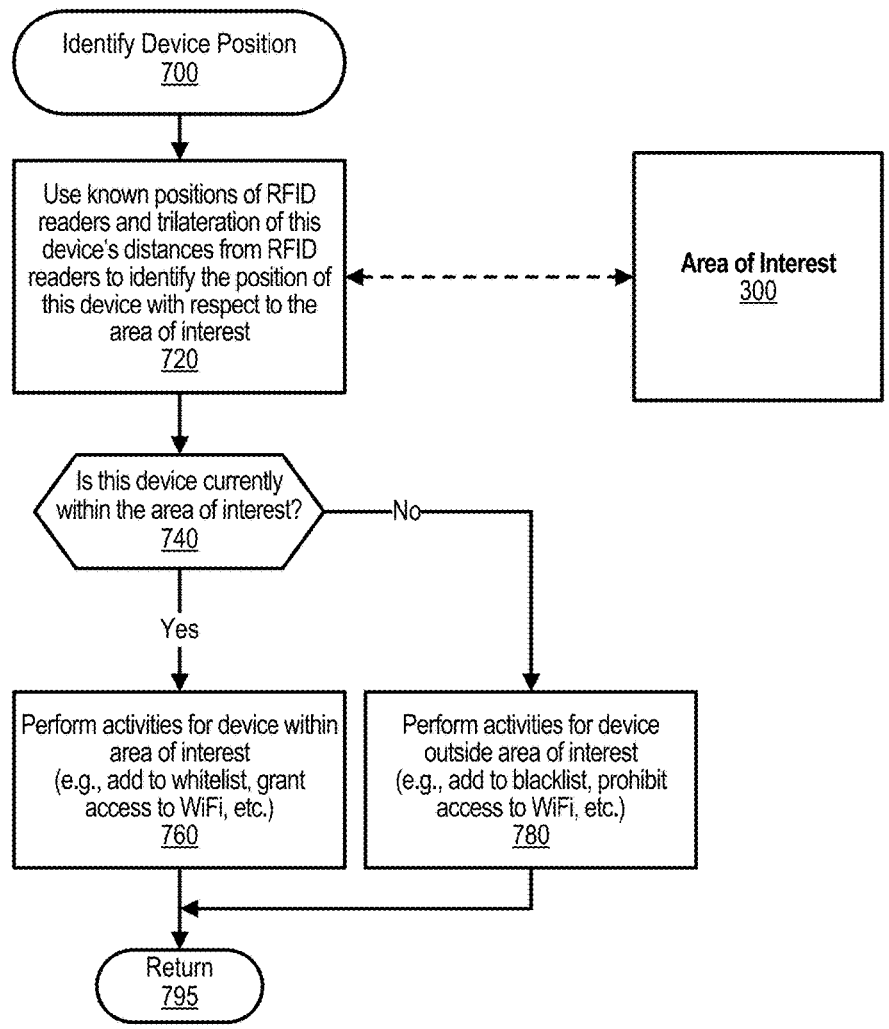
FIG. 7 is a flowchart showing steps taken to identify a device's position in relation to an area of interest based on calculating distances received from the RFID tag embedded in the device to at least three different RFID readers.

FIG. 7 is a flowchart showing steps taken to identify a device's position in relation to an area of interest based on calculating distances received from the RFID tag embedded in the device to at least three different RFID readers. FIG. 7 processing commences at 700 and shows the steps taken by the location wizard process that identifies a device's geographic position based on distance data between the device and the RFID readers. At step 720, the process uses the known geographic locations of the RFID readers and calculates the device's geographic position based on distances between the RFID readers and the RFID tag. This geographic position can then be compared to the area of interest. The location wizard process determines whether the device is currently within the area of interest (decision 740). If the device is currently within the area of interest, then decision 740 branches to the 'yes' branch whereupon, at step 760, the process performs activities for devices within the area of interest (e.g., allow the device wireless access to the network by adding the device to a whitelist, grant access to the WiFi, etc.). On the other hand, if the device is currently outside the area of interest, then decision 740 branches to the 'no' branch whereupon, at step 780, the process performs activities for devices outside the area of interest (e.g., deny wireless access to the device by adding the device to a blacklist, prohibit access to the WiFi, etc.). FIG. 7 processing thereafter returns to the calling routine (see FIG. 6) at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving, from a radio frequency identification (RFID) tag included with a device, at least three different charge times, each of the charge times corresponding to a different RFID reader, and wherein each of the RFID readers is at a different geographic location;
   approximating a distance between each of the RFID readers and the RFID tag based on the respective charge times;
   calculating a geographic position of the RFID tag using trilateration based on the approximate distances to each of the three RFID readers at the different geographic locations; and
   determining whether to allow the device wireless access to a computer network based on the geographic position of the RFID tag.

2. The method of claim 1 further comprising:
   mapping the geographic position of the RFID tag, wherein the mapping includes a map of an area of interest and the geographic location of each of the RFID readers, wherein the determination of whether to allow the device wireless access is based on whether the geographic position of the RFID tag is within the area of interest.

3. The method of claim 2 further comprising:
   in response to the geographic position of the RFID tag being within the area of interest, including a device identifier corresponding to the device in an access control list that allows the device wireless access to the computer network; and
   in response to the geographic position of the RFID tag being outside the area of interest, including a device identifier corresponding to the device in an access control list that disallows the device wireless access to the computer network.

4. The method of claim 1, wherein the at least three RFID readers include a first RFID reader, a second RFID reader, and a third RFID reader, and wherein the method further comprises:
   charging the RFID tag from the first RFID reader during a first period during which the second and third RFID readers are not sending out charges;
   receiving, from the RFID tag, an identifier corresponding to the RFID tag and a first charge time indicating a first amount of time taken to charge the RFID tag from the first RFID reader;
   charging the RFID tag from the second RFID reader during a second period during which the first and third RFID readers are not sending out charges;
   receiving, from the RFID tag, the identifier corresponding to the RFID tag and a second charge time indicating a second amount of time taken to charge the RFID tag from the second RFID reader;
   charging the RFID tag from the third RFID reader during a third period during which the first and second RFID readers are not sending out charges; and
   receiving, from the RFID tag, the identifier corresponding to the RFID tag and a third charge time indicating a third amount of time taken to charge the RFID tag from the third RFID reader.

5. The method of claim 4, further comprising:
   approximating a first distance between the RFID tag and the first RFID reader based on the first charge time, a second distance between the RFID tag and the second RFID reader based on the second charge time, and a third distance between the RFID tag and the third RFID reader based on the third charge time.

6. The method of claim 4 further comprising:
   storing an entry in a memory area corresponding to each of the first, second, and third charge times; and
   performing the calculating step in response to detecting, by a controller, that at least three entries from different RFID readers have been stored in the memory corresponding to the RFID identifier.

7. The method of claim 1 further comprising:
   determining to allow the device wireless access to the computer network in response to a first determination that the RFID tag is within an area of interest;
   after a period of time, re-performing the receiving, approximating, and calculating steps a second geographic position of the RFID tag;
   determining that the second geographic position is outside the area of interest; and
   inhibiting the device wireless access to the computer network in response to the determination that the second geographic position of the RFID tag is outside the area of interest.

* * * * *